UNITED STATES PATENT OFFICE 2,683,097

COATING GLASS FIBERS WITH UNSATURATED POLYSILOXANOLATE AND ARTICLE PRODUCED THEREBY

Lawrence P. Biefeld, Granville, Ohio, assignor to Owens-Corning Fiberglas Corporation, a corporation of Delaware No Drawing. Application April 17, 1951,
Serial No. 221,512

13 Claims. (Cl. 117—76)

This invention relates to the treatment of glass fibers to improve the strength properties of structures and the retention of such strength properties under high humidity conditions when glass fibers are combined with resinous materials in the manufacture of laminates, glass fiber reinforced plastics, coated glass fiber fabrics and the like.

Because of the hydrophilic nature of and the perfectly smooth non-absorbent characteristics of glass fiber surfaces, it has been difficult to achieve strong adhesion or integration of resinous materials to the surfaces of glass fibers. When exposed to high humidity conditions, the adhesion of the resinous material for the glass fiber surface is further lessened by the displacement of the resinous coating by what appears to be a film of water. Numerous attempts have been made to modify glass fiber surfaces without impairment of other physical properties for the purpose of developing increased and preferential adhesion of resinous materials.

Some degree of success has been achieved by the use of complex compounds of the Werner type comprising treatment of the glass fibers with a trivalent nuclear chromium atom coordinated with an acid group having less than 7 carbon atoms and with a functional group contained therein. It is believed that the trivalent nuclear chromium atom has preferential attraction for the glass fiber surfaces while the acido group coordinated therewith provides the substance for developing anchorage of resinous materials. Some degree of success has also been experienced by the treatment of glass fibers with cationic active compounds having organic groups of less than 8 carbon atoms and also containing a functional group. With this type of compound, anchorage to the glass fiber surfaces is believed to result from the attraction of the cationic group centering about the basic nitrogen atom with the glass fiber surfaces while the functional organic group provides attraction for resinous materials in preference to water.

It is an object of this invention to provide a still further and improved treatment for glass fiber surfaces for modification thereof to develop better adhesion of resinous materials and it is a related object to produce new and improved glass fiber-resinous combinations employing an anchoring agent to increase the bonding relation.

Another object is to provide a treatment for glass fibers which makes use of an anchoring agent applied from an aqueous system and it is a related object to produce new and improved glass fibers treated with an anchoring agent to provide for better adhesion of resinous materials.

It has been found that improved resinous adhesion to glass fiber surfaces to provide for higher dry and wet strength in glass fiber-resinous combination is achieved by the treatment of the glass fibers with a water soluble salt of an unsaturated polysiloxane (Siloxanolate) having the general formula

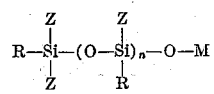

where M is an alkali metal such as sodium, potassium, lithium and including ammonium. One or more and preferably all of the R group are in the form of an unsaturated organic radical having less than 6 carbon atoms in straight chain arrangement, such as allyl, methallyl, ethallyl, vinyl, propenyl, butyne, crotenyl, allenyl and the like, with or without substituted groups such as the halogens, but the unsaturated group may have more than a total of 6 carbon atoms when the unsaturated aliphatic group forms a part of and is attached to a cyclic group such for example as styryl, chlorostyryl and the like, but it is permissible to make use of polysiloxanolates in which less than all but at least some of the organic R groups are unsaturated so long as the remaining R groups are incapable of inactivation of the unsaturated group, such for example as hydrogen or short chain substituted or unsubstituted organic radicals selected from the group consisting of aliphatics, aromatics, or heterocyclics represented by methyl, ethyl, propyl, butyl, tolyl, benzyl, furfuryl and the like. Z may be an R group of the type described in the event that the polysiloxanolate is formed of the silane $R_2SiX_2$ in which X is a hydrolyzable halogen group such as chlorine, bromine and the like, or a hydrolyzable ethoxy group such as methoxy, ethoxy or the like. Polysiloxanolates of the type which may be formed are represented by the general formula

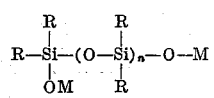

Representative compounds are sodium diallyl polysiloxanolate, sodium divinyl polysiloxanolate, potassium diallyl polysiloxanolate, sodium ethylallyl polysiloxanolate, sodium methyl styryl polysiloxanolate, and the like. Instead Z may be a grouping of the type (—O—M),

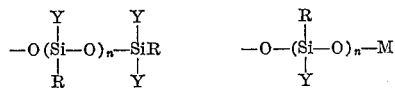

or mixtures thereof in the event that the silanes from which the polysiloxanolate is formed have three available hydrolyzable groups such as RSiX₃ wherein R and X correspond to the grouping described. Y can be R, as previously identified, —O—M, or —O— to which is attached another silicon oxide chain or the like. The chains are preferably kept to short length, otherwise cross linkage of large molecules would lead to insolubility. In the event that the polysiloxanolate is formed of a mixture of silanes having two or three hydrolyzable groups, the polysiloxanolate may have R groups substituted for Y in some places to terminate and form smaller, more water soluble compounds. These compounds will be referred to generally as sodium allyl polysiloxanolate, potassium vinyl polysiloxanolate, ammonium allyl polysiloxanolate, potassium allyl polysiloxanolate, sodium styryl polysiloxanolate, sodium methallyl polysiloxanolate, sodium methyl allyl polysiloxanolate, mixed sodium ethyl methyl vinyl polysiloxanolate and the like. The following structural formula represents a compound of the type formed by a silane having three available hydrolyzable groups.

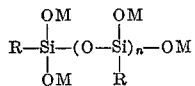

As in the manufacture of polysiloxanes by reaction of the corresponding silane or silanes through hydrolyzation to the silicols, suitable polymeric material, such as the preferred low polymeric materials, may be secured by the addition of the trichloroallyl silane, or dichlorodiallyl silane or the like or mixtures thereof to an ice cold solution of the alkali metal hydroxide to form the corresponding alkali metal polysiloxanolate. Enough alkali metal hydroxide, such as sodium hydroxide, should be present to satisfy free chlorine or other hydrolyzable groups in forming the corresponding polysiloxanolate. For reaction, the solution should contain about 3 percent by weight silane and the pH of the solution should be about 11–12.

It is believed that the repeated —Si—O—Si— linkages of the unsaturated organo-silicon polymer coordinates strongly with the silicon oxide groups that predominate on the glass fiber surfaces substantially to resist displacement by water and that the unsaturated organic groups provide a base which is highly receptive to resinous materials. Limitation as to carbon length of the unsaturated chain of the organic group is imposed because long chain groups, such as the fatty acids, are substantially nonpolar in nature and tend to inactivate or overcome the influence of the unsaturated group for providing a resinous base for the resinous materials.

Glass fibers modified in accordance with this invention are most highly receptive to resinous materials which in themselves contain unsaturated groups. Representative of resinous materials for which such treatment is particularly effected are the unsaturated polyesters, such as are sold under the trade name Plaskon 920 or Selectron 5003, which are unsaturated polyester resins provided for the laminating art and low pressure molding. Increased adhesion is also experienced in the use of thermo-plastic resins, especially those formed by addition polymerization through unsaturated linkages such as polyethylene, polystyrene, polyvinyl chloride, polyvinyl acetate, vinyl chloride-vinyl acetate copolymer, polyacrylates, polybutene, polyacrylonitriles, butadiene-acrylonitrile copolymer, butadiene-styrene copolymer and the like. Good results are also achieved with other resinous materials, such as urea formaldehyde, phenol fromaldehyde amongst the thermo-setting group and cellulose ethers and esters, polyamides and the like amongst the thermo-plastic.

In the practice of this invention, it is preferred to remove the size ordinarily applied to the glass fiber surfaces prior to the application of the unsaturated polysiloxanolate in water solution, as by a dip process, spraying, flow-coating or the like. To minimize attack on the glass fiber surfaces, application is made of the water soluble unsaturated polysiloxanolate from water solution adjusted to a pH of between 5–8. Application from solution containing 0.25–2 percent by weight of the water soluble unsaturated polysiloxanolate is sufficient but higher concentrations can be used or the treatment repeated one or more times in the event that higher concentrations on the glass fiber surfaces are desired.

When adjustment for pH is achieved by acidification as with hydrochloric acid, followed by neutralization to the desired pH by the addition of an alkali or by the addition of strong alkaline solutions of the polysiloxanolates, it is desired to wash the treated fibers after drying to remove soluble salts which might be formed. The coated fibers are then heat treated to set the unsaturated polysiloxanolates on the glass fiber surfaces. Heat treatment for 10–30 minutes at 200–250° F. is sufficient. Temperatures which render the unsaturated groups unstable should be avoided and such temperatures impose the limiting condition.

Treatment in the manner described to prepare the glass fiber surfaces for resin adhesion may be practiced with glass fiber filaments in forming, with glass fibers after they are formed, with glass fiber yarns or strands, with woven glass fiber fabrics or glass fibers arranged in various forms, such as mats, bats and the like, alone or in combination with other fibers.

The following are brief descriptions setting forth the practice of this invention:

*Example 1*

A textile fabric of glass fibers is heat cleaned to remove the size and then immersed for 5 minutes in a 1 percent water solution of sodium allyl polysiloxanolate prepared by the addition of hydrochloric acid to a more concentrated water solution of the polysiloxane having a pH of about 10–12 and adjusted back with sodium hydroxide to a pH of 7. The treated fibers are allowed to air dry and then rinsed in cold tap water to rinse off soluble salts formed by the pH adjustment. Although one treatment ordinarily is sufficient, the process may be repeated one or more times to build up higher concentrations of the unsaturated polysiloxanolates on the glass fiber surfaces. Thereafter the treated fabric is heated at a temperature of about 212–230° F. for 15 minutes.

*Example 2*

A textile fabric of glass fibers is heat cleaned to remove the size and then treated with a 1 percent by weight solution of sodium allyl polysiloxanolate adjusted to a pH of 5, using the same steps set forth in Example 1.

Example 3

A textile fabric of glass fibers is heat cleaned to remove the size and then immersed for about 5 minutes in a 1 percent water solution of sodium vinyl polysiloxanolate adjusted to a pH of about 7. This is followed by an air dry and then the treated fabric is rinsed to wash off the salts as in Example 1, air dried and then heated for 15-30 minutes at about 220° F.

Illustration of the practice of this invention is made with glass fiber fabrics which are similar in character for the purpose only of enabling comparison with each other and with other treating compositions of the type previously described. It will be understood that coresponding techniques may be used with other types of glass fibers and that endless webs of glass fiber fabrics may be passed continuously through a bath of the treating composition for the purpose of effecting the desired modification of the glass fiber surfaces by mass production process.

For purposes of comparison, laminates were prepared of the treated fabrics with an unsaturated polyester, such as Plaskon 920, for comparison with fabrics treated with diallyl diethoxysilane and an unsaturated polyester, such as Selectron 5003, with fabrics treated with methacrylato chromic chloride. Twelve plies of each fabric were molded under 30 pounds per square inch pressure for 30 minutes at 230° F. to form laminates in which the glass content averaged about 45-50 percent by weight.

The following tables illustrate the improvement secured by treatment in accordance with this invention as compared to strength properties secured by the treatment of similar glass fiber fabrics with diallyl diethoxysilane and methacrylato chromic chloride:

| Treatment | Laminating Resin | Flexure Strength×10³ p. s. i. Days Wet | | | | | Percent Water Absorption |
|---|---|---|---|---|---|---|---|
| | | 0 | 1 | 3 | 7 | 14 | |
| Diallyl diethoxysilane | Plaskon 920 | 36 | 30 | 27 | 27 | 29 | 1.16 |
| Sodium allyl polysiloxanolate pH7. | do | 61 | 47 | 45 | 45 | 47 | 1.49 |
| Sodium allyl polysiloxanolate pH5. | do | 52 | 45 | 45 | 45 | 46 | 1.00 |
| Sodium vinyl polysiloxanolate pH7. | do | 36 | 27 | 28 | 28 | 27 | 1.50 |
| Methacrylato Chromic chloride. | Selectron 5003 | 44 | 28 | 29 | 30 | 30 | 1.00 |
| Sodium allyl polysiloxanolate pH7. | do | 53 | 53 | 49 | 43 | 43 | 0.22 |
| Sodium vinyl polysiloxanolate pH7. | do | 53 | 49 | 39 | 37 | 36 | 0.33 |

It will be apparent from the results that treatment in accordance with this invention greatly improves the flexure strength, both dry and after immersion in water, as compared to treatments of glass fibers with diallyl diethoxysilane or with methracrylato chromic chloride. It will also be apparent that as compared to the treatment with methacrylato chromic chloride, structures formed of glass fibers treated in accordance with this invention have vastly improved resistance to water absorption.

By way of further illustration of the improvement achieved by the treatment of glass fibers in accordance with this invention, comparison will now be made of laminates formed of glass fiber fabrics treated with sodium allyl polysiloxanolate and sodium amyl polysiloxanolate:

| Treatment | Laminating Resin | Breaking Strength, Lbs. per Inch | |
|---|---|---|---|
| | | Dry | Wet |
| Diallyl diethoxysilane | Plaskon 920 | 270 | 218 |
| Sodium amyl polysiloxanolate | do | 154 | 143 |
| Sodium allyl polysiloxanolate pH7 | do | 312 | 288 |
| Sodium allyl polysiloxanolate pH5 | do | 304 | 290 |

It will be evident from this description that markedly improved strength properties and retention of such strength properties under wet conditions is achieved by the treatment of glass fibers with water soluble salts of unsaturated polysiloxanolates. The strength properties achieved even show a marked improvement over treatments which have heretofore been employed using diethyl diethoxysilanes or methacrylato chromic chloride. The sodium allyl polysiloxanolate was applied in the above treatment in one percent by weight solution in water, but similar improvement results from the treatment with one-half or even two percent solutions.

It will be understood that the treated glass fibers constitute an intermediate product capable of separate sale for subsequent treatment with resinous materials in the manufacture of coated fabrics or reinforced plastics and that such treated glass fibers constitute invention described and claimed herein as well as the combination of such fibers with resinous materials, especially the unsaturated polyesters and the like which are particularly well adapted for use in combination with glass fibers in the manufacture of laminates and molded products.

It will be further understood that changes may be made in the details of composition and method of application without departing from the spirit of the invention, especially as defined in the following claims.

I claim:

1. Glass fibers, the surfaces of which are coated to improve adhesion of resinous materials by a water soluble salt of a polysiloxanolate in which at least one of the organic groups therein has from 1-5 carbon atoms in a straight chain arrangement and in which at least one of the organic groups has from 2-5 carbon atoms in straight chain arrangement with unsaturated carbon to carbon linkages.

2. Glass fibers, the surfaces of which are coated to improve adhesion of resinous materials by a water soluble salt of an unsaturated polysiloxanolate having the general formula

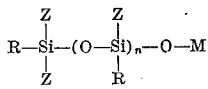

in which M is a cation selected from the group consisting of sodium, lithium, potassium and ammonium, and R is a group consisting of hydrogen, alkyl, aryl and heterocyclic radicals none of which have an aliphatic chain of more than 6 carbon atoms and in which at least one of the R group is an organic group containing an unsaturater carbon to carbon linkage in an aliphatic group formed of from 2-5 carbon atoms, and Z may be selected from the group consisting of R, OM,

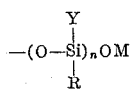

and

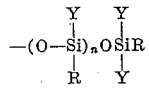

where Y is selected from the group consisting of R and OM.

3. Glass fibers as claimed in claim 2 in which the water soluble unsaturated polysiloxanolate is the water soluble salt of allyl polysiloxanolate.

4. Glass fibers as claimed in claim 2 in which the water soluble unsaturated polysiloxanolate is the water soluble salt of vinyl polysiloxanolate.

5. A glass fiber reinforced resinous plastic comprising glass fibers, an unsaturated polyester binder and an anchoring agent enhancing the adhesion of the binder for the glass fiber surfaces comprising a water soluble salt of a polysiloxanolate in which at least one of the organic groups therein contains from 1-5 carbon atoms in a straight chain arrangement and in which at least one of the organic groups contains from 2-5 carbon atoms in straight chain arrangement with unsaturated carbon to carbon linkages.

6. A glass fiber reinforced resinous plastic comprising an unsaturated polyester resin reinforced with glass fibers having an anchoring agent insolubilized on the glass fiber surfaces to increase adhesion of the resinous material, the anchoring agent comprising an unsaturated polysiloxanolate having the general formula

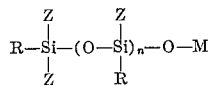

in which M is a cation selected from the group consisting of sodium, lithium, potassium and ammonium, and R is a group consisting of hydrogen, alkyl, aryl and heterocyclic radicals none of which have an aliphatic chain of more than 6 carbon atoms and in which at least one of the R group is an organic group containing an unsaturated carbon to carbon linkage in an aliphatic group formed of from 2-5 carbon atoms, and Z may be selected from the group consisting of R, OM,

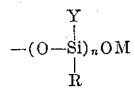

and

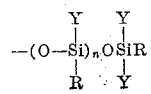

where Y is selected from the group consisting of R and OM.

7. The method of modifying the surfaces of glass fibers to increase adhesion of resinous materials comprising the steps of treating the glass fiber surfaces with an aqueous solution of a water soluble salt of an unsaturated polysiloxanolate in which at least one of the organic groups therein contains from 1-5 carbon atoms in a straight chain arrangement and in which at least one of the organic groups contains from 2-5 carbon atoms in a straight chain arrangement with unsaturated carbon to carbon linkages, and then heating the treated fibers at a temperature between 200-250° F. to set the polysiloxanolate on the glass fiber surfaces.

8. The method of modifying surfaces of glass fibers to increase adhesion of resinous materials comprising the steps of treating glass fiber surfaces with an aqueous solution of a water soluble salt of an unsaturated polysiloxanolate having the general formula

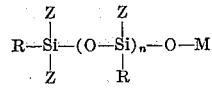

in which M is a cation selected from the group consisting of sodium, lithium, potassium and ammonium, and R is a group consisting of hydrogen, alkyl, aryl and heterocyclic radicals none of which have an aliphatic chain of more than 6 carbon atoms and in which at least one of the R group is an organic group containing an unsaturated carbon to carbon linkage in an aliphatic group formed of from 2-5 carbon atoms, and Z may be selected from the group consisting of R. OM,

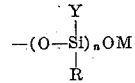

and

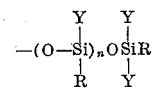

where Y is selected from the group consisting of R and OM, and insolubilizing the polysiloxanolate on the glass fiber surfaces.

9. The method as claimed in claim 8 in which the treating solution of the water soluble unsaturated polysiloxanolate is adjusted to a pH between 5 and 8.

10. The method as claimed in claim 8 in which the treating solution contains 0.25-2.0 percent by weight of the water soluble unsaturated polysiloxanolate.

11. The method as claimed in claim 8 in which the treated glass fibers are allowed to air dry after being treated with the aqueous solution of the water soluble unsaturated polysiloxanolate and then rinsed with water to remove soluble salts therefrom.

12. The method as claimed in claim 8 in which the treated glass fibers are baked at a temperature ranging from 200-250° F. for 10-30 minutes.

13. In the method of treating glass fibers to increase adhesion of resinous materials thereto, the steps of treating the glass fibers with a 0.25-2.0 percent aqueous solution of a water soluble salt of a polysiloxanolate in which the organic groups contain less than 6 carbon atoms in any straight chain arrangement and in which at least some of the organic groups contain unsaturated carbon to carbon linkages, the aqueous solution being adjusted to a pH between 5 and 8 prior to treatment of the glass fibers, air drying the treated glass fibers, rinsing the treated glass fibers with water to remove water soluble salts therefrom, and heating the treated glass fibers to a temperature between 200–250° F. for 10–30 minutes to set the polysiloxanolate on the glass fiber surfaces.

References Cited in the file of this patent

UNITED STATES PATENTS

| Number | Name | Date |
|---|---|---|
| 2,392,805 | Biefiield | Jan. 15, 1946 |
| 2,507,200 | Elliott et al. | May 9, 1950 |
| 2,513,268 | Steinman | June 27, 1950 |
| 2,563,288 | Steinman | Aug. 7, 1951 |
| 2,587,636 | MacMullen | Mar. 4, 1952 |